United States Patent [19]

Domes et al.

[11] 4,222,463
[45] Sep. 16, 1980

[54] MECHANICALLY ACTUATED BRAKE PISTON WITH ELASTOMERIC BUSHING

[75] Inventors: E. A. Domes, Carpentersville; Dusan M. Vacval, Buffalo Grove, both of Ill.

[73] Assignee: International Harvester Company, Chicago, Ill.

[21] Appl. No.: 8,995

[22] Filed: Feb. 5, 1979

[51] Int. Cl.³ .......................................... F16D 55/224
[52] U.S. Cl. .................................... 188/72.3; 188/216
[58] Field of Search ..................... 118/72.3, 72.4, 216, 118/71.8, 196 P; 90/26.84

[56] References Cited
U.S. PATENT DOCUMENTS

| 2,994,410 | 8/1961 | Burnett | 188/72.3 |
| 3,392,808 | 7/1968 | Soltis | 188/216 X |

Primary Examiner—Duane A. Reger
Attorney, Agent, or Firm—Douglas W. Rudy; Ronald C. Kamp; F. David AuBuchon

[57] ABSTRACT

An elastomeric bushing encircles a piston of a mechanically operated disc brake system forming a seal between the piston and its host cylindrical bore. The elastomeric bushing provides for a small amount of lateral piston travel and will provide a retraction means to return the brake piston to a position of repose.

13 Claims, 6 Drawing Figures

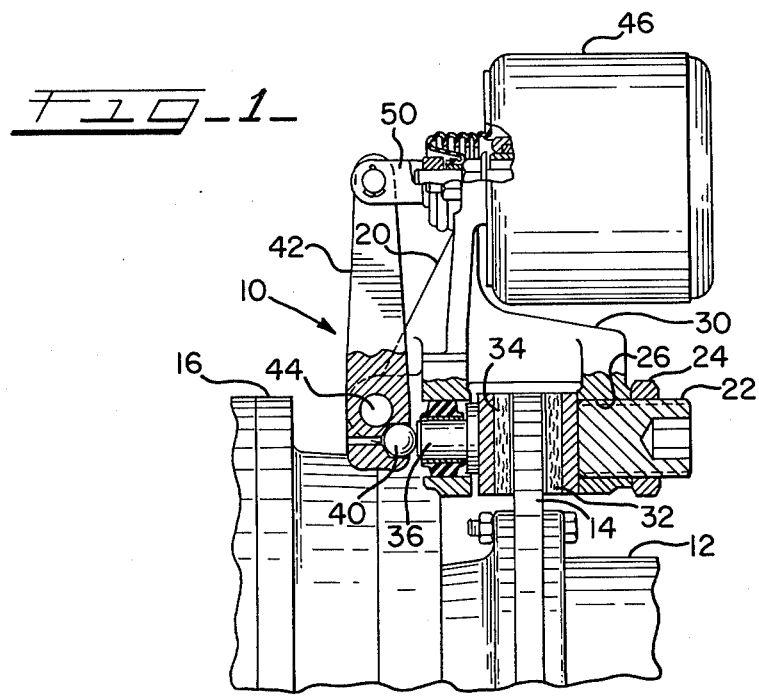
Fig-1-
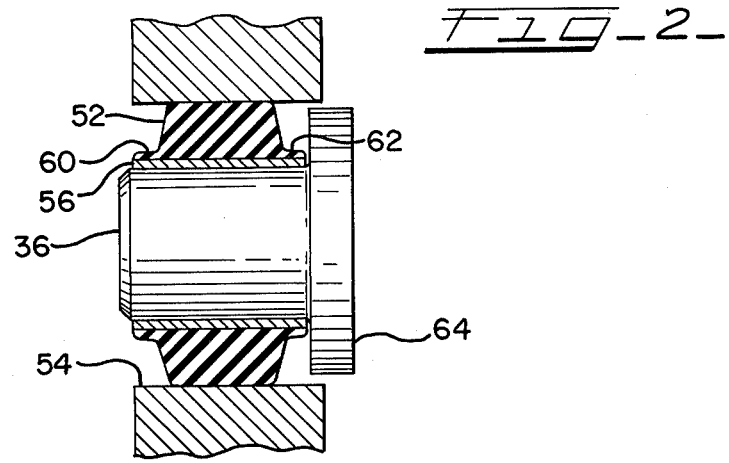
Fig-2-

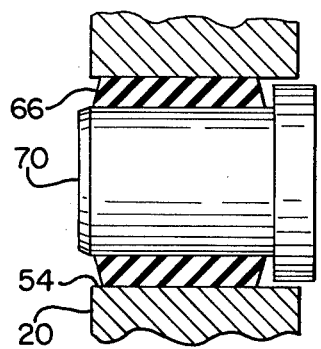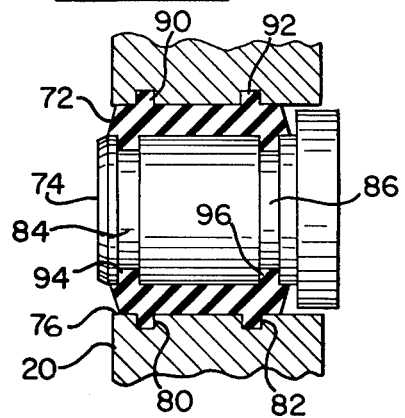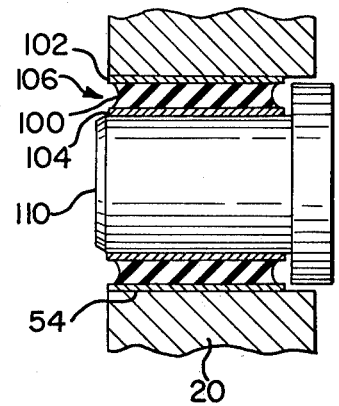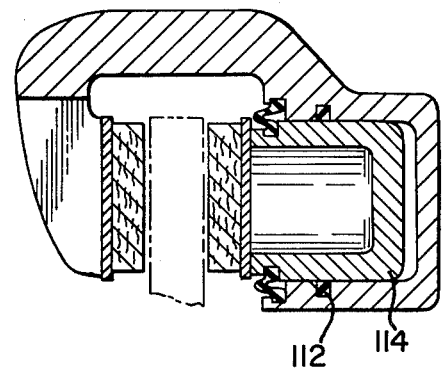

MECHANICALLY ACTUATED BRAKE PISTON WITH ELASTOMERIC BUSHING

BACKGROUND OF THE INVENTION

1. Field of the Invention

This invention has to do with mechanically actuated disc brake systems and more particularly, methods and apparatus for returning an actuating piston thereof to an initial position.

2. Description of the Prior Art

Retraction of the brake piston to its original position is of primary importance in this invention.

Many disc brake systems are known where the purpose of a retraction system is to move a caliper piston and its associated friction pad away from the brake rotor when the brake is disengaged. The prior art known to the applicant also performs a second function that is not desired or beneficial in the applicant's embodiment. This second function is to provide adjustability in the brake piston arrangement so that the friction pad is always close to (but not touching) the brake rotor thus minimizing the stroke necessary to apply the brakes. The applicant proposes that this "wear take-up" feature in the prior art is not necessary with the instant invention and would actually be detrimental to the efficiency of this disc brake unit.

In a hydraulically actuated disc brake system the piston usually accommodates a sealing ring of generally square cross section. The sealing ring primarily seals the piston-to-cylinder clearance preventing fluid from leaking out of the fluid chamber. Several U.S. patents have issued wherein the sealing ring also has resilient properties that tend to slightly retract the fluid actuated piston in the bore. None of these devices prevent the piston from moving laterally in the bore as the function pad wears out. This lateral motion is welcomed in the prior art as it allows the wear take-up provision but this is not desired in the instant invention as the primary purpose is to retract the piston to an unadjusted permanent position.

Also a problem with prior art devices, where the piston is a sliding fit in the host bore, is that when these adjacent surfaces are exposed to dirt, water and mud corrosive problems could exist and cause these parts to seize.

SUMMARY OF THE INVENTION

A mechanically actuated disc brake system incorporates a caliper housing having provisions for mounting a pair of friction pads on opposite sides of a disc brake rotor. An outboard friction pad is located laterally by a stationary but adjustable adjusting bolt. The inboard friction pad is attached to a piston residing in an open-ended bore and is laterally movable toward the disc rotor surface upon displacement by a mechanically actuated linkage. An elastomeric bushing encircles the piston and is in full contact with the interior surface of the bore.

The elastomeric bushing will yield to allow a degree of lateral piston movement and will retract the piston to its original position.

The mechanical actuating linkage includes a ball carried in a cavity of a lever arm adjacent the piston. The retraction of the piston to its original position is necessary to maintain the ball in the cavity.

Any adjustment of this disc brake system is made by adjusting the outboard friction disc relative to the rotor through the use of the adjusting bolt associated therewith.

It is amongst the objects of this invention to provide a bushing on a piston of a disc brake system that will allow temporary lateral movement of the piston in a bore and will retract the piston to a position of repose.

Another object of this invention is to provide a piston retractor that will not be detrimentally affected by dirt, moisture, corrosion causing elements or other detrimental elements.

Still a further object of this invention is to provide a disc brake piston that will, when in a position of repose, maintain a steel ball in a cavity of the brake actuating mechanism.

Another object of this invention is to provide a brake piston actuator that will provide a retraction feature with a minimal number of components and at a cost that is less than the arrangement contemplated for use in other design embodiments.

Still another advantage of this invention is that it eliminates friction wear, lubrication and corrosion problems between the piston and its associated bore.

Also an object of this invention is that the elastomeric bushing on the piston can serve as a return spring for the actuating mechanism.

BRIEF DESCRIPTION OF THE DRAWINGS

The objects and advantages of various embodiments of the invention will be appreciated through an understanding of the following drawing figures as explained by this specification.

FIG. 1 is an elevation view of a mechanically operated disc brake system with portions removed to reveal the operating components thereof;

FIG. 2 is a cross sectioned view of a piston and its attendant elastomeric bushing bonded to a metallic sleeve;

FIG. 3 is a cross sectioned view of a piston and its attendant elastomeric bushing bonded thereto;

FIG. 4 is a cross sectioned view of a piston and a replaceable bushing in the host piston bore;

FIG. 5 is a cross sectioned view of a piston and a laminated bushing in its host bore;

FIG. 6 is a cross sectioned brake caliper, as found in the prior art, having a hydraulically actuated and automatically adjusted piston.

DETAILED DESCRIPTION OF THE INVENTION

A preferred embodiment of the invention is shown as the disc brake system generally 10 in FIG. 1. A rotating component such as drive shaft 12 supports the disc brake rotor 14 which moves with the drive shaft 12. A stationary housing 16 supports the disc brake caliper housing 20 so that it is axially slidable relative to the longitudinal dimension of the drive shaft 12. This is commonly referred to as a "floating caliper" disc brake.

An adjusting bolt 22, locked in place by a lock nut 24, is accommodated in a threaded aperture 26 of the adjusting bolt side 30 of the caliper housing. The adjusting bolt 22 may be threaded into and through the threaded aperture 26 to urge a first steel backed brake pad 32 into very close proximity to the disc brake rotor 14. The brake pad is slidably retained in the caliper housing. A second steel backed brake pad 34 is also slidably maintained in the caliper housing. It may be urged into contact with the brake rotor 14 through the displacement of the brake piston 36 responsive to pressure from the steel ball 40 as the long lever arm 42 is displaced counter-clockwise around the pivot point 44. The long lever arm 42 moves responsive to the released spring pressure of a spring in an air operated spring brake actuator 46. When there is air pressure in the actuator the spring (not shown) will be compressed. On the release of air pressure the spring will displace the long lever arm 42 through connecting linkage 50.

As clearly seen in FIG. 2 the relationship between a preferred embodiment of an elastomeric bushing 52, a piston and a through bore 54 in the caliper housing 20 is shown. In this embodiment the elastomeric bushing 52 is bonded to a metallic bushing 56 and this unified assembly is pressed onto the cylindrical body of the piston 36. This three part assembly is then pressed into the bore 54 such that the elastomeric bushing is surrounded at the full width of its periphery by the walls of the bore 54. The fit is a tight press fit and once the assembly is in position it will remain in position under normal operating conditions.

The elastomeric bushing may alternatively be bonded to a non-metallic sleeve instead of the metallic sleeve if desired.

The elastomeric bushing will generally have a annular shape with a flat outer and innermost diameter. These flat surfaces may be of the same width or, if different, the innermost surface will be wider than the outermost surface.

In a preferred embodiment the diameter of the body of the piston is considerably less than the interior diameter of the through bore 54. In order to make up this difference the substantial elastomeric bushing is used. The bushing has a generally trapezoidal cross section with an extended base not only wider than the top portion but also extending in flange-like projections 60 and 62. These flange-like projections provide a larger surface area of contact between the elastomeric component 52 and the metallic component 56 to allow for optimized bonding between the two components.

It should also be noted that the head portion 64 of the piston is not a tight fit in the bore 54.

FIG. 3 presents an alternative embodiment where an elastomeric bushing 66 is bonded directly to the piston 70 and then pressed into the bore 54 of the stationary caliper housing 20.

FIG. 4 presents a replacement elastomeric bushing 72 which is a separate piece, i.e. not bonded to the bore of the caliper housing nor to the piston 74. In this embodiment the caliper housing 20 is equipped with a modified through bore 76, the modification being the addition of a pair of circumferential grooves 80 and 82. The piston 74 is also provided with a pair of circumferential grooves 84 and 86. The replaceable elastomeric bushing 72 has the basic trapezoidal shape of the bushing 66 of FIG. 3 but additionally includes outwardly projecting circumferential flanges 90 and 92 which are so spaced on the outer diameter of the bushing 72 to fit into and mate with the circumferential grooves 80 and 82 of the bore 74. Furthermore the inner diameter of the replaceable elastomeric bushing 77 is also equipped with inwardly projecting circumferential flanges 94 and 96 that fit into the grooves 84 and 86 of the piston 74.

FIG. 5 presents a fourth embodiment of the invention wherein a generally rectangular elastomeric bushing 100 is bonded between an outer tubular sleeve 102 and an inner tubular sleeve 106 making a unified bushing assembly generally 106 which is then pressed onto the piston 110 and into the through bore 54 of the caliper housing 20.

FIG. 6 shows a prior art device that incorporates a seal 112, not bonded to its retaining groove or to the piston 114, that operates primarily as a seal in this fluid actuated brake and also as a retraction member. This sealing ring is elastically deflected to generate an elastic force which retracts the piston when braking pressure is released. As the friction pad of the brake becomes worn in excess of the elastic deflection limit of the sealing ring the elastic ring will slide on the piston to a new starting point thus maintaining a constant clearance between the friction pad and the brake rotor.

In general, the instant invention seeks to avoid the sliding of the elastomeric bushing relative to the caliper housing in the piston. There is a very good reason for this and that is that in the mechanically operated brake the piston is continuously subjected to dirt, rust and various contaminants. It would be prohibitively expensive to provide a piston having a surface that would be impervious to these elements and maintain a fine finish as would be required in the prior art device to allow the ring to slide along the piston.

Adjustment in the instant invention is facilitated through the adjustment of the adjusting bolt 22.

In operation all the embodiments operate similarly. Thus when a load is applied to the piston through the steel ball 40 as a consequence of actuation of the disc brake the piston will travel to its limit until the second steel backed brake pad contacts the brake rotor and applies the braking force. The elastomeric bushing will be elastically deformed to accommodate necessary piston stroke. With proper design of the elastomer the elastomeric bushing should stay in contact with the housing bore or with its metallic bushing (56 in FIG. 2) without slipping out. When the brake is subsequently released the brake lever arm 42 will be returned to a preset position corresponding to an unloaded position of the brake piston. The elastomeric bushing will return to its original generally trapezoidal or rectangular shape shown in FIGS. 2,3, and 5.

Notice that the piston will maintain the ball in the ball restraining cavity of the brake actuating arm. Also notice that the piston will be retracted to its initial position, that being the position that the piston was in when the piston was original pressed into the through bore of the brake mechanism. There is no provision to move the piston laterally relative to the bore to compensate for pad wear take-up. The reason for this, as described earlier, is that it is difficult to maintain a clean surface on either the bore or the piston such that corrosion problems would be eliminated.

Thus a mechanically actuated disc brake system incorporating an elastomeric bushing as a piston retraction member has been provided as disclosed in the foregoing specification that fully satisfies the objects and advantages set forth above. While several specific embodiments of the invention have been described it is apparent that many alternatives or variations could be proposed by those skilled in the art when provided with the foregoing description. Accordingly this specification is intended to embrace all such alternatives, modifications and variations as are within the spirit and broad scope of the appended claims.

What is claimed is:

1. In a mechanically actuated disc brake including a caliper housing, said housing having a through bore for receiving a brake piston, a brake piston having a cylindrical body, said piston carried in said piston receiving bore for urging a brake pad into contact with a brake rotor, the improvement comprising:

an elastomeric bushing circumferentially disposed around the cylindrical body of said piston and in the interior of said through bore of said caliper housing, said elastomeric bushing simultaneously in contact with said piston and said caliper housing, said elastomeric bushing fixed in position in said through bore and on said piston.

2. The invention in accordance with claim 1 wherein said bushing further incorporates a sleeve carried on the innermost diameter of said bushing, said sleeve having a width at least as wide as the width of the surface of the innermost diameter of said bushing.

3. The invention in accordance with claim 2 wherein said sleeve is a metallic sleeve to which said elastomeric bushing is bonded.

4. The invention in accordance with claim 2 wherein said sleeve is a non-metallic sleeve to which said elastomeric bushing is bonded.

5. The invention in accordance with claim 1 wherein said bushing comprises:

a first sleeve carried on the innermost diameter of said elastomeric bushing, said sleeve having a width at least as wide as the width of the surface of the innermost diameter of said bushing, and a second sleeve carried on the outermost diameter of said elastomeric bushing, said sleeve having a width at least as wide as the width of the surface of the outermost diameter of said bushing.

6. The invention in accordance with claim 5 wherein said first and second sleeves are bonded to said elastomeric bushing.

7. The invention in accordance with claim 1 wherein said elastomeric bushing is provided with a plurality of outwardly projecting circumferential flanges and a plurality of inwardly projecting circumferential flanges.

8. A disk brake comprising:

a disc brake caliper housing having a through bore open at both ends thereof;

a piston accommodated in said through bore, said piston having a body portion of a diameter substantially less than the interior diameter of said through bore of said disc brake caliper housing;

an elastically deformable bushing of generally trapezoidal cross sectional shape encircling said body portion of said piston and fixed thereto and in fixed continuous circumferential contact with said interior diameter of said through bore;

a brake lever arm for displacing said piston in said through bore whereby actuation of said brake lever arm results in displacement of said piston causing said bushing to be elastically deformed from said trapezoidal cross sectional shape whereupon release of said brake lever arm said bushing regains its original trapezoidal cross sectional shape.

9. The invention in accordance with claim 8 wherein said bushing further incorporates a sleeve carried on the innermost diameter of said bushing, said sleeve having a width at least as wide as the width of the surface of the innermost diameter of said bushing.

10. The invention in accordance with claim 9 wherein said sleeve is a metallic sleeve to which said elastomeric bushing is bonded.

11. The invention in accordance with claim 9 wherein said sleeve is a non-metallic sleeve to which said elastomeric bushing is bonded.

12. The invention in accordance with claim 8 wherein said bushing comprises:

a first sleeve carried on the innermost diameter of said elastomeric bushing, said sleeve having a width at least as wide as the width of the surface of the innermost diameter of said bushing, and a second sleeve carried on the outermost diameter of said elastomeric bushing, said sleeve having a width at least as wide as the width of the surface of the outermost diameter of said bushing.

13. The invention in accordance with claim 8 wherein said elastomeric bushing is provided with a plurality of outwardly projecting circumferential flanges and a plurality of inwardly projecting circumferential flanges.

* * * * *